United States Patent [19]

Reubeuze

[11] Patent Number: 5,209,637
[45] Date of Patent: May 11, 1993

[54] HYPOCYCLOIDAL TRAIN MECHANISM FOR A VEHICLE SEAT INCLUDING A BRAKE WITH DIFFERENTIAL TORQUE AND ANTI-REVERSING PROPERTIES

[75] Inventor: Yann Reubeuze, Flers, France

[73] Assignee: Bertrand Faure Automobile "BFA", Massy, France

[21] Appl. No.: 853,905

[22] Filed: Mar. 19, 1992

[30] Foreign Application Priority Data

Mar. 19, 1991 [FR] France ............................ 91 03322

[51] Int. Cl.⁵ .................... B60N 02/02; F16H 01/32; F16H 03/70
[52] U.S. Cl. .................................. 475/176; 475/162; 475/170; 475/177; 297/348; 297/362
[58] Field of Search ............... 475/162, 169, 170, 176, 475/177; 297/348, 362

[56] References Cited

U.S. PATENT DOCUMENTS

| | | | |
|---|---|---|---|
| 4,371,207 | 2/1983 | Wilking et al. | 475/162 X |
| 4,407,544 | 10/1983 | Bähring | 297/362 |
| 4,634,181 | 1/1987 | Pipon | 475/177 X |
| 4,887,863 | 12/1989 | Caillol | 475/177 X |
| 4,895,038 | 1/1990 | Pipon et al. | 475/176 X |
| 4,986,602 | 1/1991 | Blanchard | 297/362 |
| 5,005,907 | 4/1991 | Caillol | 297/362 |
| 5,096,261 | 3/1992 | Baloche | 475/170 X |

FOREIGN PATENT DOCUMENTS 0099549 2/1984 European Pat. Off. .
8002677 12/1980 World Int. Prop. O. .

Primary Examiner—Leslie A. Braun
Assistant Examiner—David E. Henn
Attorney, Agent, or Firm—Robert W. Becker & Associates

[57] ABSTRACT

In a hypocycloidal train mechanism, an annular spring is mounted in front of a roller bearing housed between a double satellite and a control cam on a face turned toward a mobile flange. This annular spring has a semi-circular cross-section, with one end of the spring being curved and hooked inside a cutout of the control cam, while the other end of the spring is free.

3 Claims, 2 Drawing Sheets

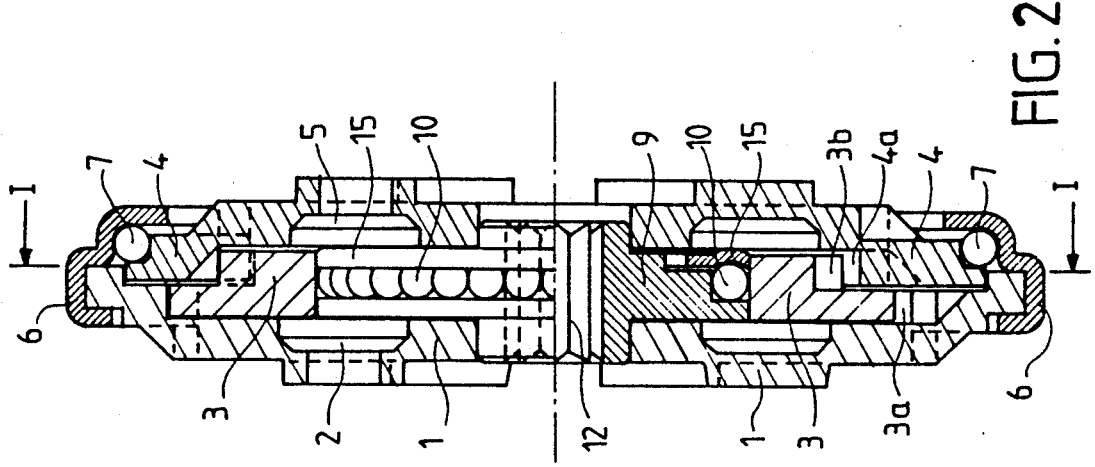
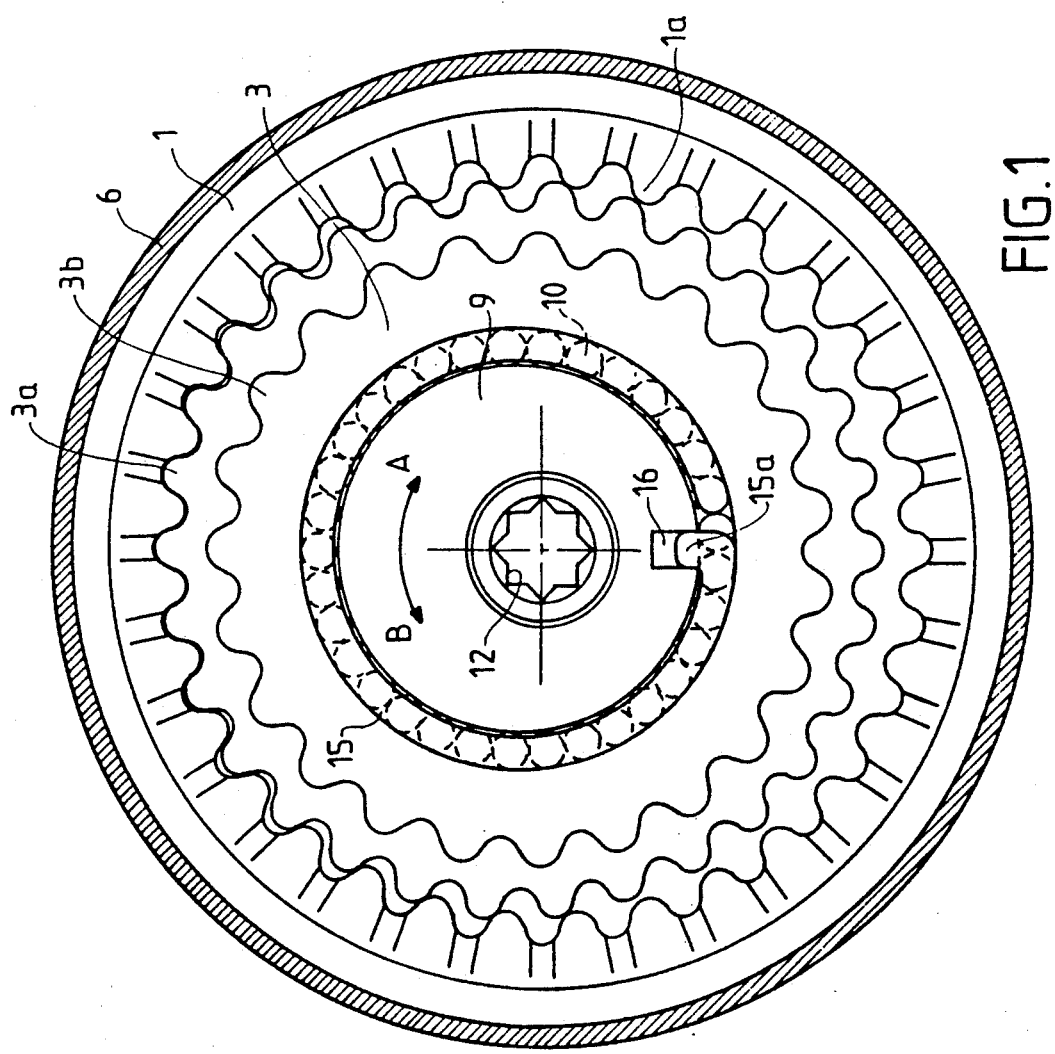

HYPOCYCLOIDAL TRAIN MECHANISM FOR A VEHICLE SEAT INCLUDING A BRAKE WITH DIFFERENTIAL TORQUE AND ANTI-REVERSING PROPERTIES

BACKGROUND OF THE INVENTION

The invention relates to a hypocycloidal train mechanism for a vehicle seat including a brake with differential torque and anti-reversing properties.

Hypocycloidal train reducing mechanisms are used for vehicle seats in order to adjust either the sitting portion of the seat, or the inclination of its back portion in order to put the seat in a position corresponding favorably to the passenger's morphology.

But these mechanisms, despite the care taken during manufacture, include plays between : i) the toothings of the fixed and mobile flanges, and ii) the toothings of the double satellite driven by a cam. Accordingly, jerks during the operation of these mechanisms result, and these movements cause very rapidly unpleasant sensations for the passenger using the seat. When this phenomenon is examined, it is found that the satellite exhibits a tilting motion and rotates therefore in a jerky manner and faster than the cam.

WO-A-80/02677 shows a reducing device including two half cams with an interposed spring with a double spiral. The purpose is here to redoes the play between cam and satellite, which is not the object the present invention is concerned with.

In order to avoid reversibility, EP-A-O 099 549 shows placing a flexible buffer between the articulation operating knob, i.e. the cam, and a recess in the mobile flange of the seat back portion. In addition to the fact that it requires a direct intervention by the user's hand, this member does not provide for a sufficient braking of the mechanism since, at most, the cam is slightly braked.

SUMMARY OF THE INVENTION

The hypocycloidal train mechanism for a vehicle seat, having a seat back to be raised and lowered, of the present invention includes a brake with differential torque and anti-reversing properties, and is comprised of: a control shaft and a control cam connected to the control shaft; a fixed flange with an inner toothing, the fixed flange receiving the cam; a double satellite with first and second outer toothings, positioned inside said fixed flange. With the inner toothing of the fixed flange intermeshing with the first outer toothing, the double satellite having a central opening for receiving the cam; a ball bearing arranged between an inner wall surface of the central opening and a circumferential portion of the cam; a mobile flange with an inner toothing, the inner toothing of the mobile flange intermeshing with the second outer toothing; a crimped ring connecting the fixed flange and the mobile flange at their radially outer peripheries; a second ball bearing arranged between the mobile flange and the crimped ring; an annular spring with a curved first end and a second end, whereby the annular spring is arranged axially outwardly of the ball bearing on a face of the ball bearing facing the mobile flange and with a radially outwardly oriented surface of the spring resting on the inner wall surface of the central opening of the double satellite, the annular spring having a semi-circular cross-section; and the control cam having a cutout along one of the centering axes of the train mechanism, with the curved first end being inserted into the cutout, while the second end is free, so that upon rotation of the mechanism a friction is generated between the spring an the inner wall surface of the opening of the satellite for insuring a jerk-free continuous rotation and a constant rotation speed of the mobile flange.

Preferably, the annular spring is made of a special springs. It is advantageous that the annular spring is substantially symmetrically convey in its initial state for providing a jerk-free movement when lowering and raising the seat back of the vehicle seat.

Various other features of the invention will become more apparent from the following detailed description.

BRIEF DESCRIPTION OF THE DRAWINGS

An embodiment of the invention is shown by way of non-limiting example in the accompanying drawings, wherein:

FIG. 1 is a plan view of a hypocycloidal train mechanism, partly in cross-section taken along line I—I of FIG. 2, provided with the brake with anti-reversing properties of the invention;

FIG. 2 is a diametrical cross-section of the mechanism of FIG. 1;

DESCRIPTION OF PREFERRED EMBODIMENTS

Figure 3:
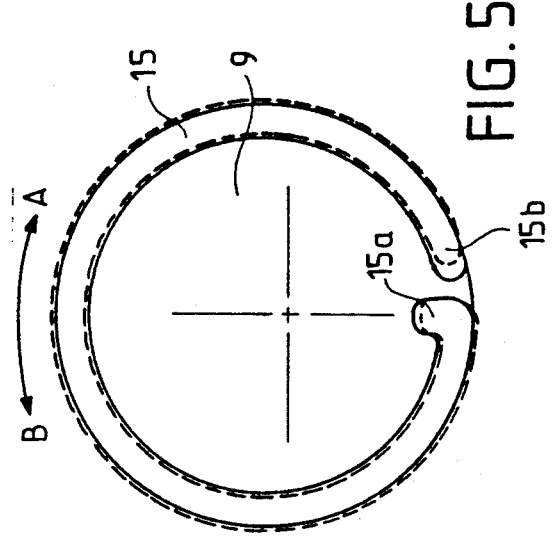
FIG. 3 is a plan view of the anti-reversing spring.

Referring now to the drawings, FIGS. 1 and 2 show that the mechanism is comprised of a fixed flange 1 that is rigidly connected, when, for example, used on a seat, to the sitting portion of the seat by means of fixation devices placed in recesses 2. In general, three such devices are positioned at 120° with respect to one another.

The fixed flange 1 encloses a double satellite 3 having a toothing 3a which intermeshes with the toothing 1a of the fixed flange 1, while a toothing 3b of the double satellite 3 intermeshes with the toothing 4a of a mobile flange 4. The mobile flange 4 is connected to the armature of the seat back portion via fixation devices housed inside recesses 5 also positioned at 120° with respect to one another.

The mobile flange 4 is connected to the fixed flange 1 by means of a crimped ring 6 which is rigidly connected with the fixed flange 1 and which contains a roller bearing 7 interposed between the mobile flange 4 and the crimped ring 6.

Finally, the satellite 3 is mounted with its central opening on a cam 9 with interposition of a roller bearing 10 between the inner wall surface of the central opening of the double satellite 3 and the cam 9. Rotation of the cam 9 is carried out via a control shaft (not shown) having utings cooperating with corresponding fluting of the hollowed portion of the cam 9. The hereabove described mechanism is a hypocycloidal train reducing mechanism which may be fully or partially reversible.

When the device is driven in rotation via the control shaft. The double satellite 3 is rotated and via its toothing rolls on the fixed toothing 1a of the fixed satellite 1. Therefore, via the toothings 4a and 3b, a rotation of the mobile flange 4 which is connected to the seat back portion armature as already mentioned, takes place.

Figure 4:
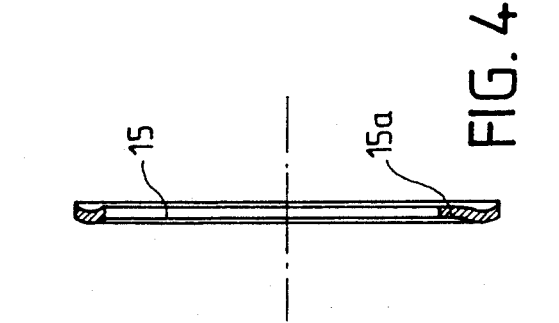
FIG. 4 is a diagonal cross-sectional view of the anti-reversing spring.

But due to slight impreciseness when making i) the toothing 1a of the fixed flange 1, ii) the toothing 4a of the mobile flange 4, and iii) the toothings 3a and 3b of the double satellite 3, hard points are produced. These hard points impart a high turning resistance to the control shaft of the mechanism, which, when the mechanism is driven in the direction for lowering and raising the seat back portion, causes, by action on the cam 9, a tension on an annular spring 15 of a semi-circular cross-sectional shape (FIG. 4).

The annular spring 15 enables compensation of the different effort values exerted on the flutings 12 of the control shaft as well as on the tilting of the double satellite 3, by compensating the angular plays between the control cam 9 and the double satellite 3.

For this purpose, the spring 15 which is of a substantially symmetrically curved shape in its initial state, has one end 15a engaged inside a cutout 16 of the cam 9, arranged along one of the centering axes of the train mechanism so that, when the spring 15 is stretched, it brakes the rotational movement by having its other end 15b rubbing against the inner wall surface of the opening of the satellite 3, thereby controlling and regulating the movement of the cam 9, and therefore the movement of the mechanism.

Accordingly, a continuous operation, without jerks, of the mechanism during its movement for lowering the seat back portion as well as for returning the seat back portion to an upright position is provided, and the mobile flange 4 accordingly rotates at a constant rotation speed.

Figure 5:
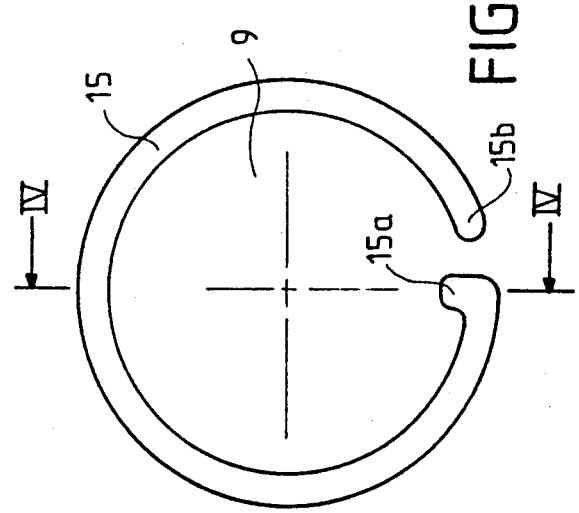
FIG. 5 is an operational schematic view of the anti-reversing spring.
Figure 7:
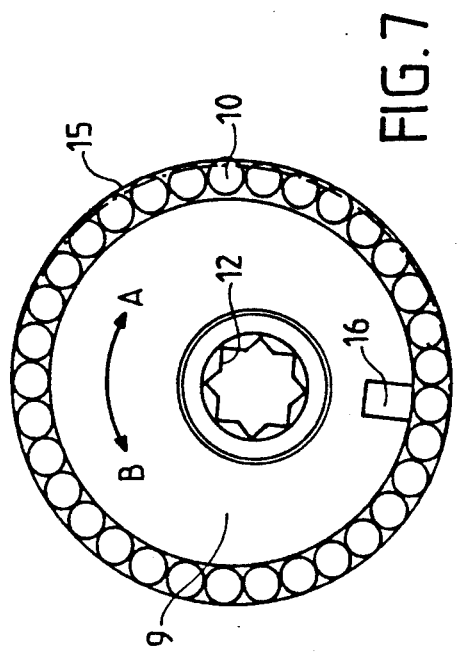
FIGS. 6, 7 are plan views showing the operation of the device.
Figure 6:
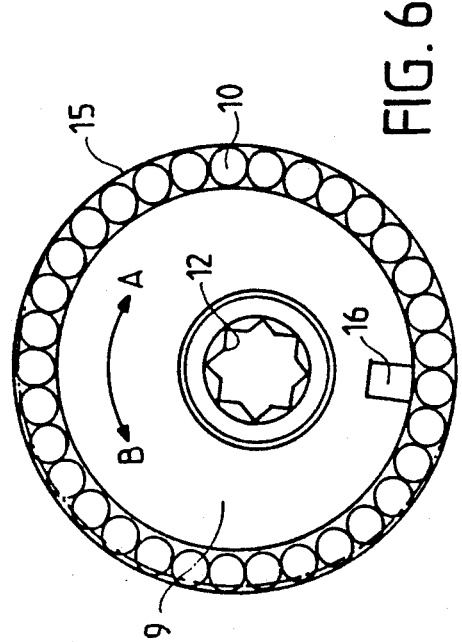

In direction A (see the arrow in FIG. 5), the torque is greater since the end 15b of the spring 15 supports itself within the central opening of the satellite 3 due to the thrust exerted by the cutout 16 on the curved end 15a of the spring 15. In the direction B, the cutout 16 will drive the curved end 15a of the spring 15, which will have a tendency to reduce the surface area and the pressure of the spring 15 in the satellite 3, thereby reducing the torque value. Since the assembly of the members is symmetrical, the rotation direction B is used only in the direction bringing the seat back portion upwardly with respect to the sitting portion. The rotation in the direction A, due to a larger friction between the spring 15 and the satellite 3 caused by the expansion of the spring 15 and the braking action, avoids the jerks when lowering the seat back portion. Due to the fact that the satellite 3 is driven by the toothing 4a of the mobile flange 4 the end 15b of the spring 15 is also driven. Thus, the satellite 3 and the cam 9 are interlocked, avoiding any movement of the cam g and the reversing of the mechanism.

Although the hereabove description is made with reference to a hypocycloidal mechanism, the spring 15 can also be used with epicycloidal mechanisms, having a simple train, a wheel and tangent screw, and the like, under the condition that there is a rotation between two parts.

Of course, the shape of the spring 15 can vary. Generally, this spring is made of a special spring steel meeting the characteristics of the mechanism and the loads applied thereto.

The present invention is, of course, in no way restricted to the specific disclosure of the specification and drawings, but also encompasses any modifications within the scope of the appended claims.

What I claim is:

1. A hypocycloidal train mechanism for a vehicle seat with a seat back to be raised and lowered, including a brake with differential torque and anti-reversing properties, said mechanism comprising:

a control shaft;

a control cam connected to said control shaft;

a fixed flange with an inner toothing, said fixed flange receiving said cam;

a double satellite with first and second outer toothings, positioned inside said fixed flange, said inner toothing of said fixed flange intermeshing with said first outer toothing, said double satellite having a central opening for receiving said cam;

a first ball bearing arranged between an inner wall surface of said central opening and a circumferential portion of said cam;

a mobile flange with an inner toothing, said inner toothing of said mobile flange intermeshing with said second outer toothing;

a crimped ring connecting said fixed flange and said mobile flange at their radially outer peripheries;

a second ball bearing arranged between said mobile flange and said crimped ring;

an annular spring with a curved first end and a second end, said annular spring being arranged axially outwardly of said fist ball bearing on a face of said first ball bearing facing said mobile flange and with a radially outwardly oriented surface of said spring resting on said inner wall surface of said central opening of said double satellite, said annular spring having a semi-circular cross-section; and said control cam having a cutout along one of the centering axes of said train mechanism, with said curved fist end being inserted into said cutout, while said second end is free, so that upon rotation of said mechanism ia friction is generated between said spring an said inner wall surface of said opening of said satellite for insuring a jerk-free continuous rotation and a constant rotation speed of said mobile flange.

2. A mechanism according to claim 1, wherein said annual spring is made of a spring steel.

3. A mechanism according to claim 1, wherein said annular spring is symmetrically curved in an initial state of said spring for providing a jerk-free movement when lowering and raising the seat back.

* * * * *